(12) United States Patent
Kim (10) Patent No.: US 6,873,859 B2
(45) Date of Patent: Mar. 29, 2005

(54) METHOD FOR SEVICING FACSIMILE USING WIRELESS LOCAL LOOP SYSTEM

(75) Inventor: Tae Won Kim, Kyonggi-do (KR)

(73) Assignee: LG Electronics Inc., Seoul (KR)

( * ) Notice: Subject to any disclaimer, the term of this patent is extended or adjusted under 35 U.S.C. 154(b) by 654 days.

(21) Appl. No.: 09/748,239

(22) Filed: Dec. 27, 2000

(65) Prior Publication Data
US 2001/0041564 A1 Nov. 15, 2001

(30) Foreign Application Priority Data
Dec. 30, 1999 (KR) .............................. 99-65530

(51) Int. Cl.$^7$ ............................................... H04M 1/00
(52) U.S. Cl. ................................ 455/556.1; 455/426.2; 455/554.2; 455/557
(58) Field of Search ........................... 455/426.2, 556.1, 455/557, 552.1, 554.2, 567; 379/93.09, 100.01, 142.07

(56) References Cited

U.S. PATENT DOCUMENTS

| | | | | |
|---|---|---|---|---|
| 5,953,675 A | * | 9/1999 | Rabina et al. | 455/557 |
| 6,181,953 B1 | * | 1/2001 | Shirota et al. | 455/557 |
| 6,571,109 B1 | * | 5/2003 | Kim | 455/555 |

* cited by examiner

Primary Examiner—Temica M. Davis
(74) Attorney, Agent, or Firm—Fleshner & Kim, LLP (57) ABSTRACT

A method for servicing facsimile using a WLL system in which facsimile data are transmitted in real time after a Fixed Subscriber Unit FSU and a Wireless Local Loop WLL Processing Block of the Code Division Multiple Access CDMA type WLL system for converting a service option to a facsimile call in state that a voice call between the transmitting side and the receiving side is set. In a WLL networks including at least one or more FSUs and Base Transceiver Stations BTSs, a WLL Processing Block, and a Public Switched Telephone Network PSTN, a method for servicing facsimile using WLL system comprising steps of requesting call establishment of a second facsimile telephone connected with the PSTN in a first facsimile telephone connected with the FSU, responding to the request of call establishment automatically or manually in the second facsimile telephone, and converting a service mode of the first facsimile telephone to a data mode in case that a facsimile tone provided from the second facsimile telephone to the first facsimile telephone is detected after the response and transmitting data from the first facsimile telephone to the second facsimile telephone. Accordingly, it is possible to provide a facsimile service using a facsimile telephone with performing a digital facsimile service and a service option within the WLL network without adding an extra network element.

20 Claims, 7 Drawing Sheets

METHOD FOR SEVICING FACSIMILE USING WIRELESS LOCAL LOOP SYSTEM

BACKGROUND OF THE INVENTION

1. Field of the Invention

The present invention relates to a Wireless Local Loop WLL capable of facsimile service, and more particularly to a method for servicing facsimile using a WLL system in which facsimile data are transmitted in real time after confirming that a facsimile telephone of a transmitting side is connected with a communication channel of a receiving side facsimile telephone in CDMA type WLL system.

2. Background of the Related Art

Until now, the most widely used facsimile service is that which were provided during G3 facsimile telephone period through a Public Switched Telephone Network PSTN. Moreover, it is possible to install a facsimile emulator in a personal computer and transmit facsimile data by using the facsimile emulator due to the spread of the personal computer.

However, subscribers to communication networks require various communication services due to recent continuous developments in a communication field. Especially, subscribers to a WLL system require a facsimile service using a G3 facsimile telephone used in a general wire network.

However, the facsimile service require relatively longer time when subscribers set a call with a receiving side in a specific area where a PSTN connected with the WLL system is superannuated. Accordingly, there are occasions that a receiving side, to which a user transmits a facsimile data, is transmitting a facsimile data to other facsimile telephones or receiving in advance a facsimile data transmitted from other facsimile telephones even if a facsimile telephone of the user reports that the facsimile data of the user is successfully and normally transmitted to the facsimile telephone of the receiving side.

The transmitting side, which is connected with the superannuated PSTN, transmits a message of "Comm Error" for reporting a communication error due to the failure of the facsimile modem conversation, since it takes too much time to connect a call of the transmitting side in case that the transmitting side transmits the facsimile data to the receiving side connected with the WLL system.

Moreover, in case that the receiving side uses a facsimile machine both as a telephone and a facsimile, if the user of the transmitting side pushes a facsimile number of the receiving side to transmit a facsimile data, and if a facsimile of a receiving side is set as a telephone mode, the transmitting side user must telephone to the receiving side user should telephone to request the receiving side user to convert the facsimile machine of the receiving side user from the telephone mode to a facsimile mode and start facsimile transmission operation again from the beginning.

SUMMARY OF THE INVENTION

Therefore, the present invention is derived to resolve the above disadvantages and problems of the related art and has an object to provide a method for servicing facsimile in a CDMA type WLL system in which a Fixed Subscriber Unit FSU and a WLL Processing Block can transmit facsimile data in real time by detecting a facsimile tone for converting service option to a facsimile call.

In order to achieve the above object of the present invention, in a WLL network including at least one or more FSUs and Base Transceiver Stations BTSs, a WLL Processing Block, and a PSTN, there is provided a method for servicing facsimile using a WLL system includes the steps of requesting call establishment of a second facsimile telephone connected with the PSTN in a first facsimile telephone connected with the FSU, responding to the request of the call establishment automatically or manually in the second facsimile telephone, and converting a service mode of the first facsimile telephone to a data mode in case that a facsimile tone provided from the second facsimile telephone to the first facsimile telephone is detected after the response and transmitting data from the first facsimile telephone to the second facsimile telephone.

According to another aspect of the present invention, in a WLL network including at least one or more FSUs and Base Transceiver Stations BTSs, a WLL Processing Block, and a PSTN, there is provided a method for servicing facsimile using the WLL system includes the steps of requesting call establishment of a second facsimile telephone connected with the FSU in a first facsimile telephone connected with the PSTN, responding to the request of the call establishment automatically or manually in the second facsimile telephone, and converting a service mode of the first facsimile telephone to a data mode in case that a facsimile tone provided from the second facsimile telephone to the first facsimile telephone is detected after the response and transmitting data of the first facsimile telephone to the second facsimile telephone.

DETAILED DESCRIPTION OF THE PREFERRED EMBODIMENTS

The present invention will be explained in more detail with reference to preferred embodiments in junctions with the attached drawings.

Figure 1:
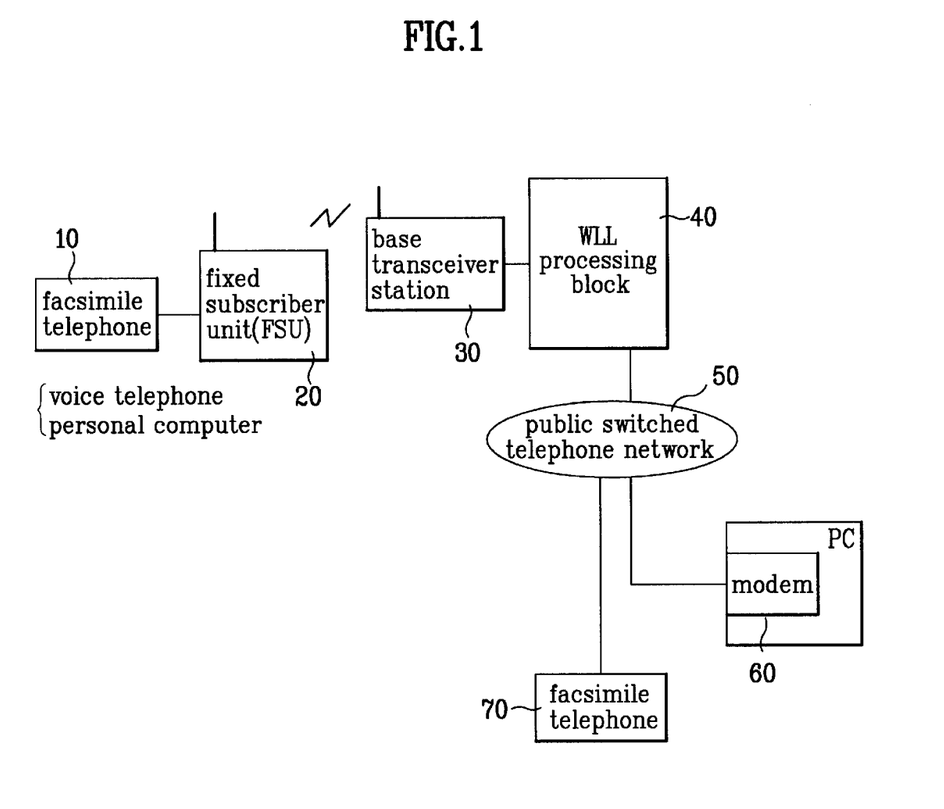
FIG. 1 is a diagram of a Code Division Multiple Access CDMA type Wireless Local Loop WLL communication network according to the present invention.

FIG. 1 is a diagram of a Code Division Multiple Access CDMA type Wireless Local Loop WLL communication network according to the present invention.

Referring to FIG. 1, the CDMA type WLL network includes a G3 facsimile telephone 10, a Fixed Subscriber Unit FSU 20 connected with the G3 facsimile telephone 10 for providing functions of a wire or wireless connection and a wireless facsimile communication, a Base Transceiver Station BTS 30 relaying a radio signal transmitted from the FSU 20 or received in the FSU 20, and a WLL Processing Block 40 controlling a data channel and a signal channel according to service option of the communication signal transmitted the BTS 30 or a Public Switched Telephone Network PSTN 50. The number of the G3 facsimile telephone 10, the FSU 20, and the BTS 30 can be continuously expanded, however, respectively one G3 facsimile telephone 10, the FSU 20, and the BTS 30 are shown in FIG. 1 for the sake of convenience according to the number of the subscribers. Moreover, the G3 facsimile telephone can be replaced with a voice telephone or a personal computer.

Figure 2:
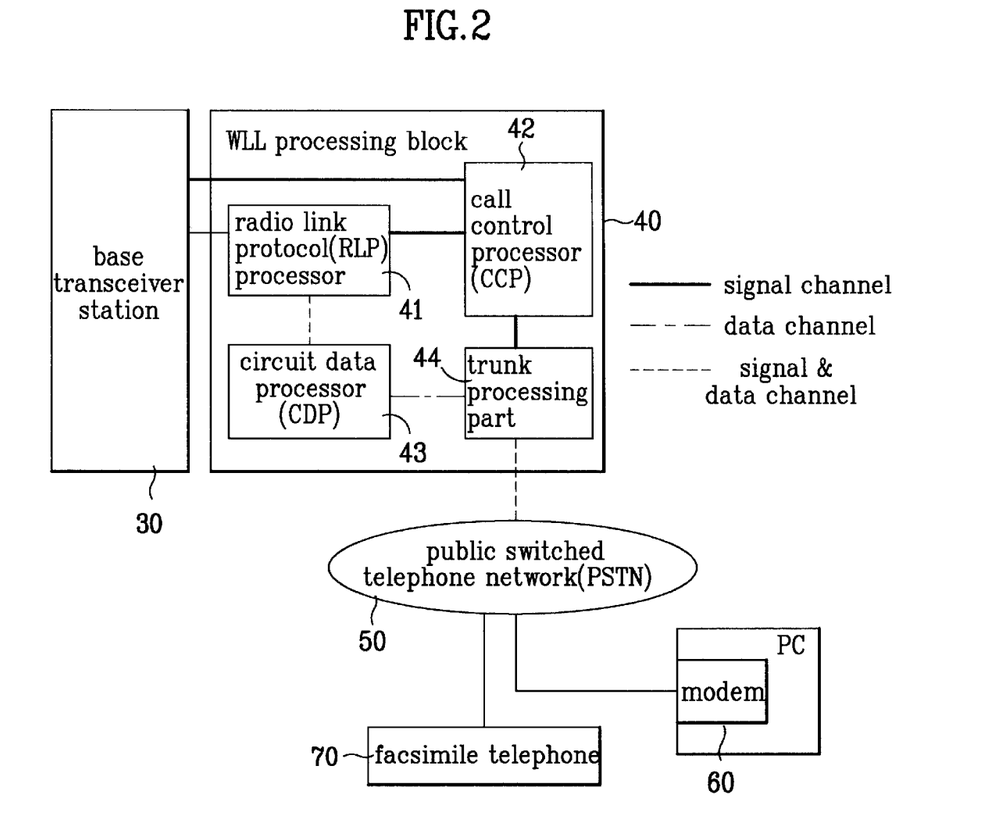
FIG. 2 is a detailed block diagram of a WLL Processing Block as shown in FIG. 1.

FIG. 2 is a detailed block diagram of a WLL Processing Block shown in FIG. 1. Referring to FIG. 2, the WLL Processing Block 40 includes a Call Control Processor CCP 42 finding out service option of the G3 facsimile telephone 10 requesting through the BTS 30, a Radio Link Protocol RLP processor 41 for controlling a radio data channel for G3 facsimile data service if the service option founded by the CCP 42 is a facsimile service, a Circuit Data Processor CDP 43 assigning a G3 facsimile modem of the CDP 43 and setting RLP used in a wireless interface if the signal output from the RLP processor 41 is a data service, and a trunk processing part 44 connected with the CCP 42 and the CDP 43 for providing channels of the PSTN 50, a signal, and a data.

Figure 3:
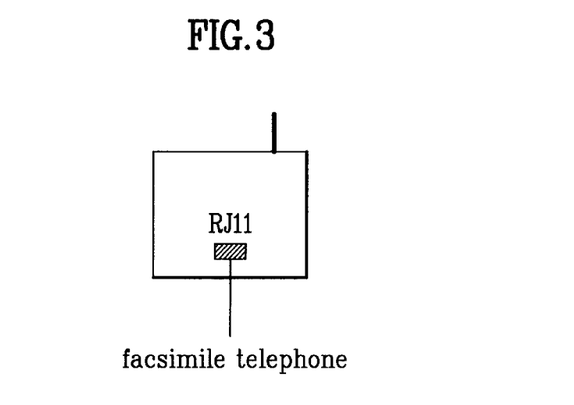
FIG. 3 shows a basic shape of a Fixed Subscriber Unit FSU as shown in FIG. 1.
Figure 4:
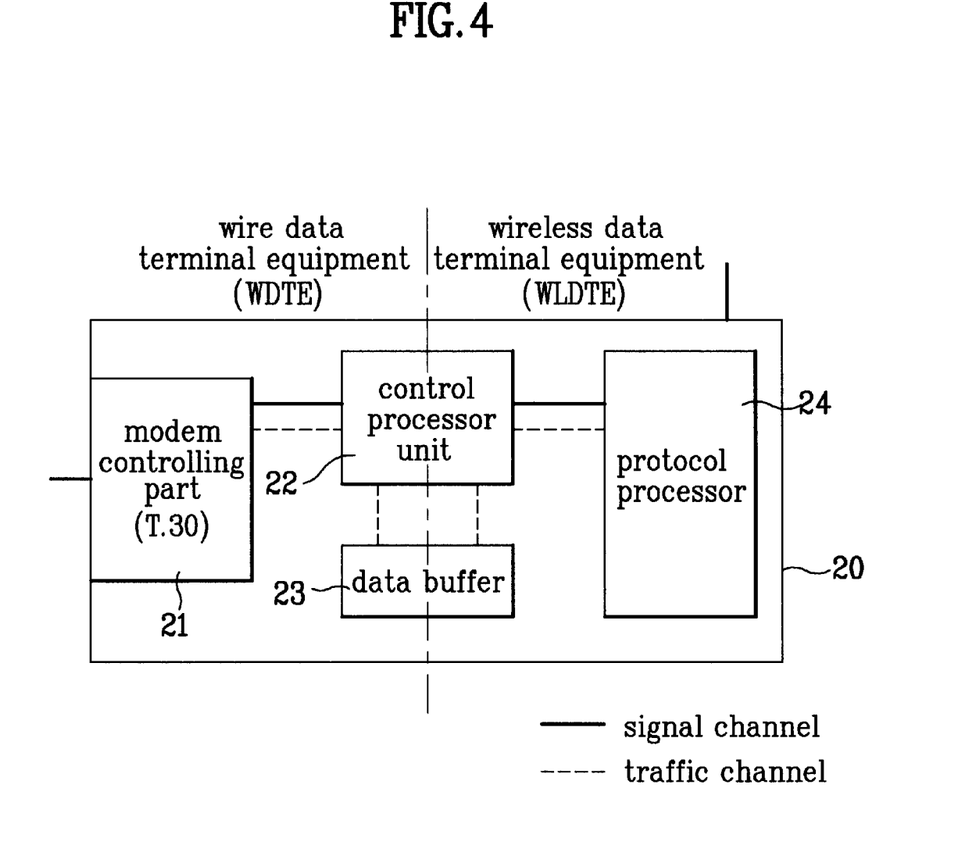
FIG. 4 is a detailed block diagram of the FSU shown in FIG. 1.

FIG. 3 shows a basic shape of a fixed subscriber unit as shown in FIG. 1 and FIG. 4 is a detailed block diagram of the fixed subscriber unit as shown in FIG. 1.

Referring to FIG. 3 and FIG. 4, T.30 protocol function and radio facsimile communication function are respectively supported by using facsimile class 2 or 2.0 in case that the G3 facsimile telephone 10 is connected with the FSU 20 with RJ11 jack.

The function of the FSU 20 can be divided into a Wire Data Terminal Equipment WDTE and a Wireless Data Terminal Equipment WLDTE.

A modem controlling part 21 provides the G3 facsimile telephone 10 connected with the FSU 20 with a dial tone or a ring tone and detects a Dual Tone Multiple Frequency tone and facsimile tones (V. 20 preamble, CNG, CED) in the G3 facsimile telephone 10.

For reference, Calling Tone CNG is transmitted from the transmitting side facsimile telephone 10 to a receiving side facsimile telephone 70 after a voice channel is set through a service option procedure between the transmitting side facsimile telephone 10 and the receiving side facsimile telephone 70. Called Station Identification CED is a kind of facsimile tone, which is selectively transmitted from the receiving side facsimile telephone 70 having been received the CNG to the FSU 20.

Figure 5A:
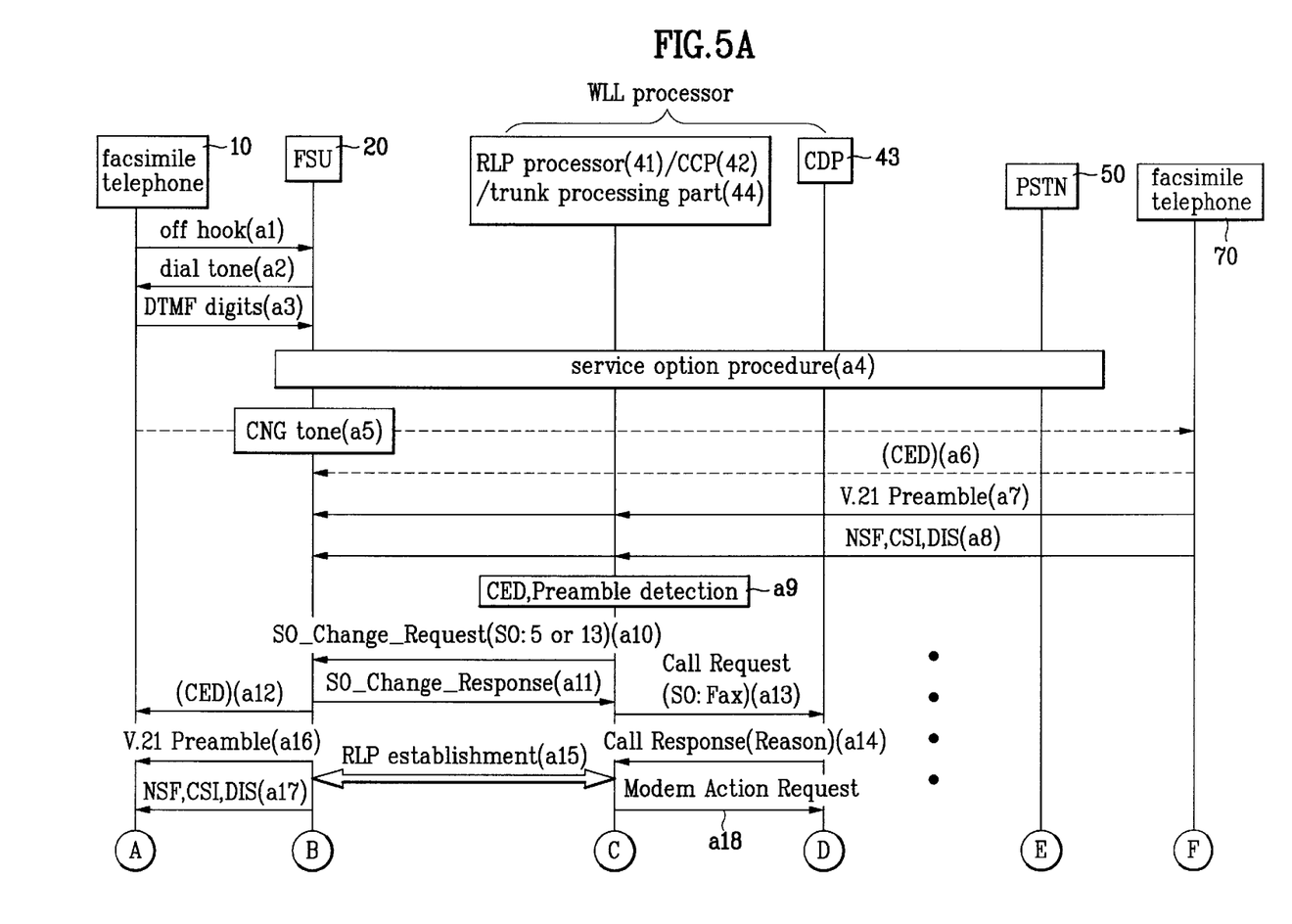
FIG. 5 is a flow chart for explaining a transmitting procedure of a facsimile telephone which is connected with the FSU according to a first preferred embodiment of the present invention.
Figure 5B:
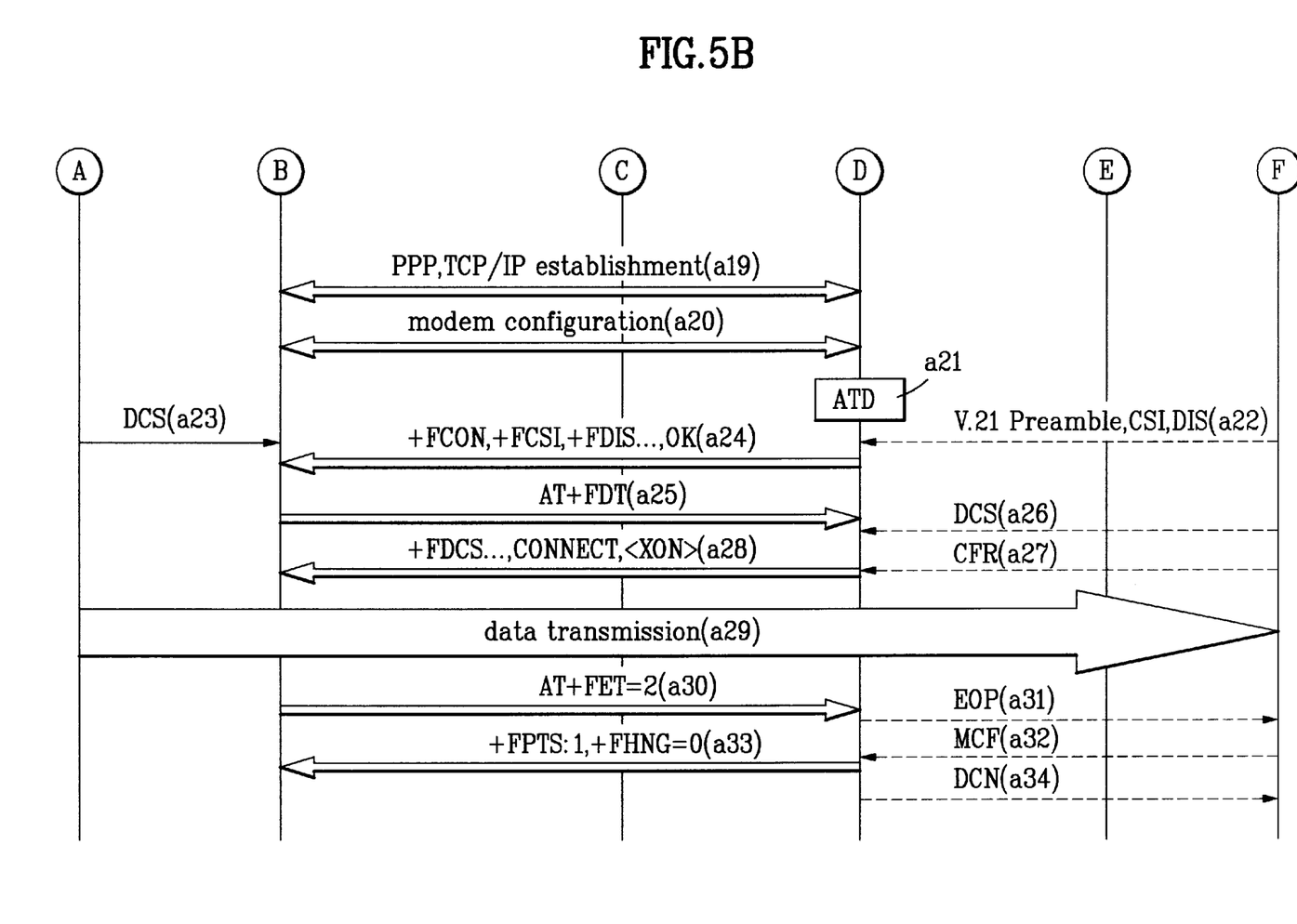
Figure 6A:
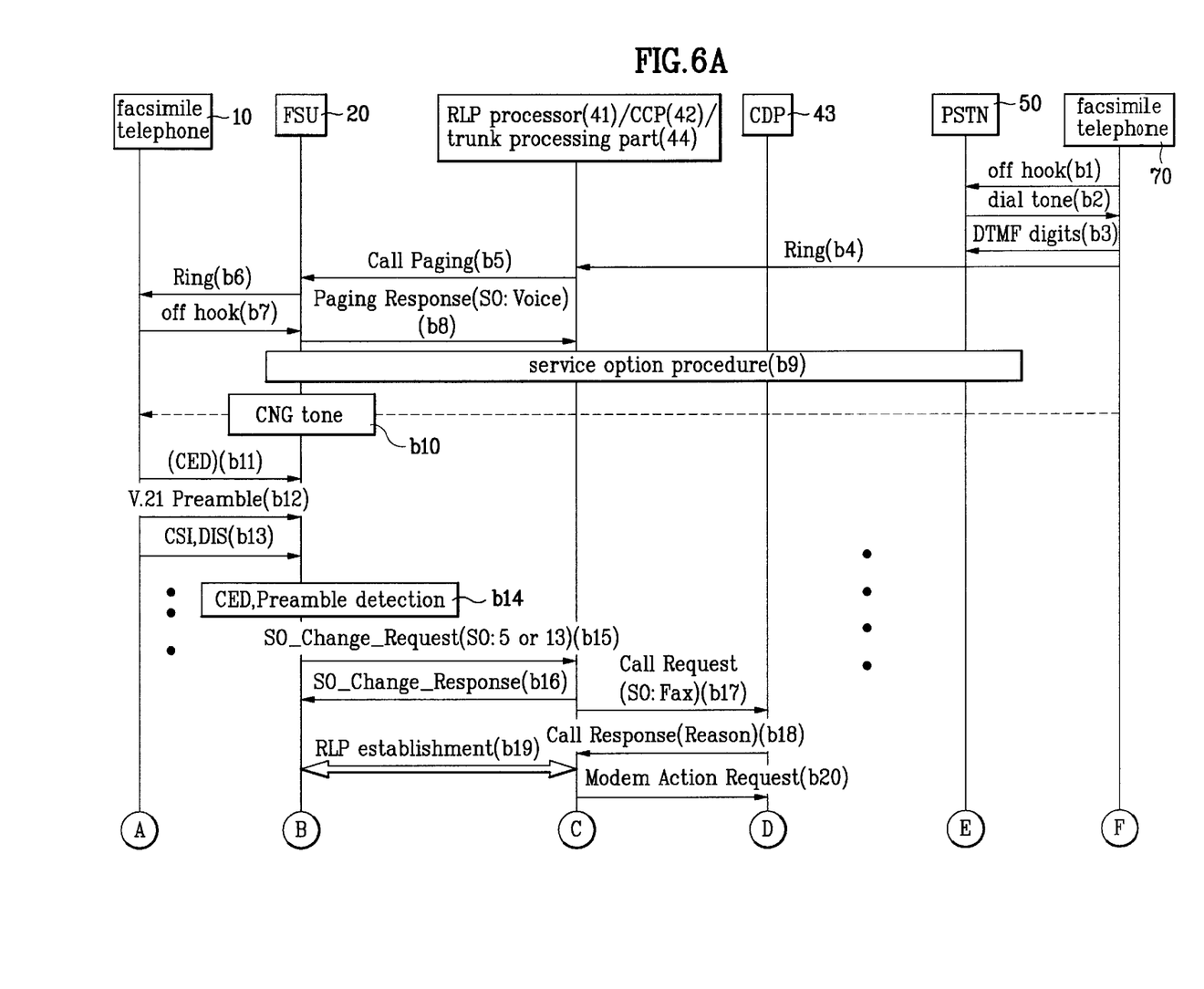
FIG. 6 is a flow chart for explaining a transmitting procedure of a facsimile telephone connected with a Public Switched Telephone Network PSTN according to a second preferred embodiment of the present invention.
Figure 6B:
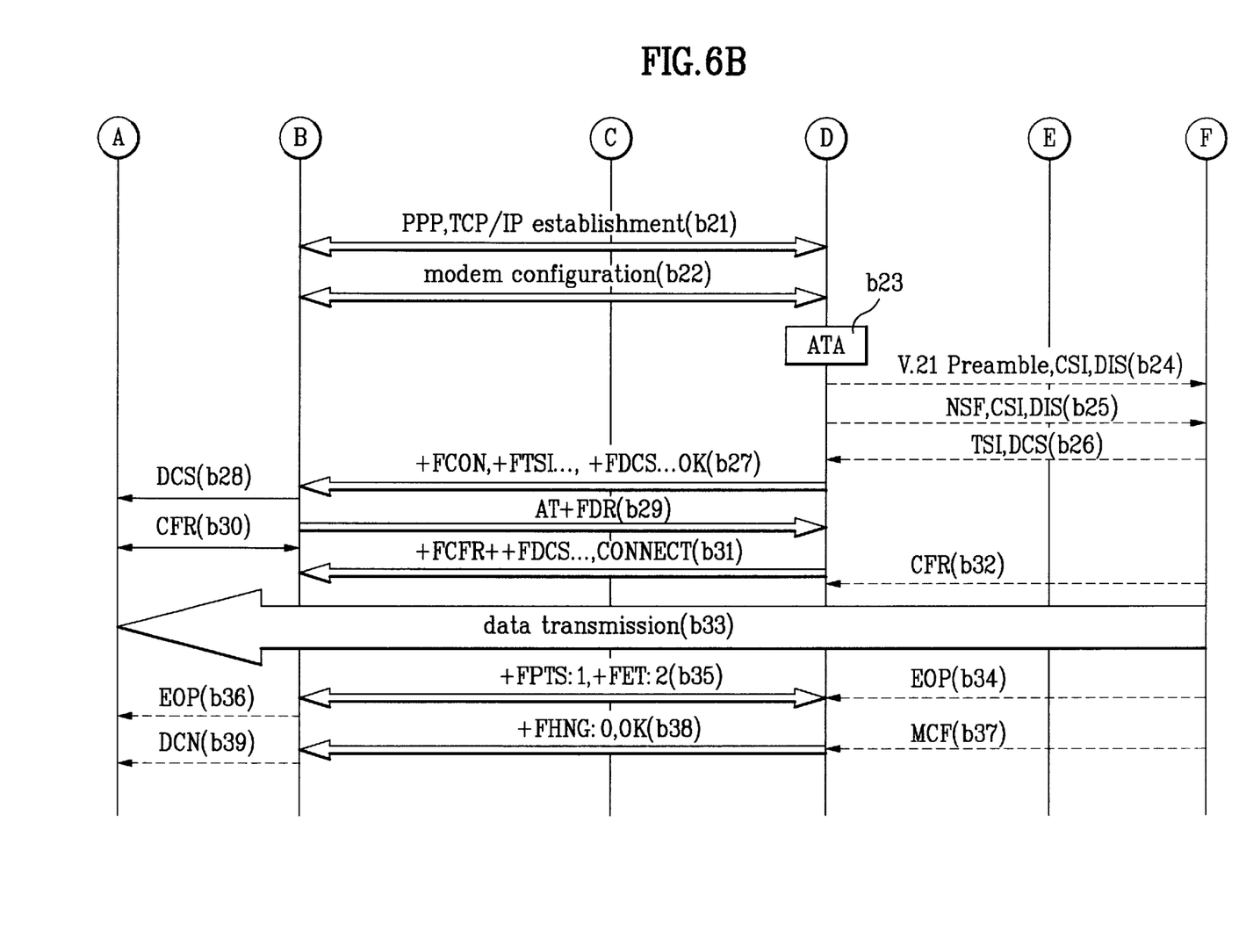

Transmitting and receiving operations of the CDMA type WLL system with relation to facsimile data will be described referring to FIG. 5 and FIG. 6.

In a first preferred embodiment of the present invention, it is assumed that the CDMA type WLL network includes the G3 facsimile telephone 10 and the FSU 20, in which G3 facsimile data service is supported and has the shape of the FSU in FIG. 3.

Transmitting Operation of a Facsimile Telephone Connected with a FSU

First, transmitting operation of a specific facsimile telephone connected with a FSU will be described referring to FIG. 5.

A specific subscriber of the CDMA WLL network hooks off a transmitting side facsimile telephone 10 connected with a FSU 20 (a1) and confirms dial tone provided from the FSU 20 (a2). The subscriber pushes the telephone number of a receiving side facsimile telephone 70 (a3). At this time, the telephone number of the receiving side facsimile telephone is input to a modem controlling part 21 of the FSU 20 and the telephone number is transmitted to a central processor unit 22 with being detected as a DTMF tone by a Dual Tone Multiple Frequency detecting device (not shown). The modem controlling part 21 confirms the receipt of the telephone number of the receiving side and transmits the ring tone of the transmitting side facsimile telephone 10. The central processor unit 22 having been received the DTMF tone requests a voice call to a protocol processor 24 and the protocol processor 24 requests a voice call to a BTS 30. The Base Transceiver Station BTS 30 transmits a voice call request message to a Call Control Processor CCP 42 of a WLL Processing Block 40 according to the voice call request of the protocol processor 24. The CCP 42 of the WLL Processing Block 40 confirms the voice call request message of the BTS 30 and transmit the call request message to the receiving side facsimile telephone 70 connected with the PSTN 50 through the trunk processing part 44.

A service option procedure is proceeded between the FSU 20 and the PSTN 50 according to the voice call request message, so that a voice channel between the facsimile telephones 10 and 70 is set.

For reference, the voice channel is set between the RLP processor 41 and the trunk processing part 44 of the WLL Processing Block 40 by way of the FSU 20 and the BTS 30.

The CNG of the transmitting side facsimile telephone 10 is continuously transmitted to the receiving side facsimile telephone 70 through the voice channel set between the FSU 20 and the PSTN 50.

If the call request massage is transmitted from the BTS 30 to the receiving side facsimile telephone 70 through the PSTN 50 as a ring tone, it is possible that the receiving side facsimile telephone 70 automatically responds to the call request message or a user responds to the call request message manually by hooking off the telephone. Especially, in case that the user manually responds by hooking off the telephone, if the user of the receiving side facsimile telephone 70 converts a voice mode of the facsimile telephone into a facsimile mode after performing the telephone conversation with the user of the transmitting side facsimile telephone 70, it becomes the same operation as the automatic responding to the call request message.

The receiving side facsimile telephone 70 selectively transmits Called Station Identification (CED) to the FSU 20 (a6) and periodically generates V.21 preamble data for transmitting to the FSU 20 (a7). The V.21 preamble data is necessary for reporting that the receiving side facsimile telephone 70 is operating in a facsimile mode. Besides, the receiving side facsimile telephone 70 periodically generates Non-standard Facilities (NSF), Called Subscriber Identification (CSI) or Digital Identification Signal (DIS) including product information or setting state of the specific receiving side facsimile telephone for transmitting to the FSU 20 (a8).

For reference, the V. 21 preamble data is transmitted to the FSU 20 by being modulated by Frequency Shift Keying (FSK)(On/Off=>1850 Hz/1650 Hz, 1 second period pulse).

While the V.21 preamble data, NSF, CSI and DIS are periodically transmitted from the receiving side facsimile telephone 70 to the FSU 20, if a facsimile tone(V.21 preamble or CED) is detected in a vocoder (not shown) including the RLP processor 41 during voice telephone conversation (a9), the vocoder reports the CCP 42 of the WLL Processing Block 40 that the receiving side facsimile telephone 70 is set as a facsimile mode. According to the report, the CCP 42 of the WLL Processing Block 40 transmits a service option change request message (SO_Change_Request) to the FSU 20 connected with the transmitting side facsimile telephone 10 for requesting to change a service option of the transmitting side facsimile telephone 10, because the transmitting side facsimile telephone 10 is basically set as a voice service option when transmitting.

The FSU 20 confirms whether the transmitting side facsimile telephone 10 connected with the FSU 20 operates as a facsimile mode or a voice mode and takes an appropriate process. That is, the FSU 20 reports the CCP 42 of the WLL Processing Block 40 that the service option of the transmitting side facsimile telephone 10 has been changed into a facsimile call by transmitting a service option change response (SO_Change_Response) message which is a response signal to the service option change request message to the CCP 42 of the WLL Processing Block 40 (a11).

The CCP 42 of the WLL Processing Block 40 having been received the service option change response message including facsimile call change information from the FSU 20 reports the RLP processor 41 that there is a facsimile call request from the FSU 20.

The RLP processor 41 transmits a call request message to the CDP 43 for requesting call to the changed facsimile service option (a13), and the CDP 43 assigns modem resources and transmits a call response message to the RLP processor 41 as a signal responding to the request (a14), so that a Radio Link protocol (RLP) used in a radio period of the BTS 30 and the FSU 20 is set (a15). At this time, the voice channel set between the RLP processor 41 and the trunk processing part 44 is closed and a new data channel of the RLP processor 4113 the CDP 4313 the trunk processing part 44 is set.

After transmitting the service option change response message, the FSU 20 transmits CED (a12), V.21 preamble (a16) or NSF, CSI, DIS (a17) to the G3 facsimile telephone 10 for providing the transmitting side facsimile telephone 10 with the modem information of the FSU 20. In case that the service option of the FSU 20 is a voice mode, CED, V.21 preamble or NSF, CSI, DIS are periodically generated for being transmitted to the transmitting side facsimile telephone 10 after the transmitting side facsimile telephone 10 generates DTMF tone.

A G3 data controller having been received a modem action request message and formed in the CDP 43 of the WLL Processing Block 40 initializes the assigned modem and sets Point-to Point Protocol (PPP) and Transmission Control Protocol/Internet Protocol (TCP/IP) between the FSU 20 and the WLL Processing Block 40.

The initial setting of a modem for transmitting facsimile data between the FSU 20 and the transmitting facsimile telephone 10 agrees with the initial setting of a modem for transmitting facsimile data between the WLL Processing Block 40 and the receiving facsimile telephone 70 through a modem configuration procedure.

While the CDP 43 is set as a transmitting modem(ATD) (a21), if the V.21 preamble or CSI, DIS are transmitted from the transmitting facsimile telephone 70 to the CDP 43 (a22), the CDP 43 transmits "+FCON, +FCSI,+FDIS . . . , OK" data and so on to the FSU 20 (a24). The +FCON is a data for reporting facsimile connection established between the subscribers 10, 70, +FCSI is a data for reporting identification information of the receiving side from the CSI frames, and +FDIS is a data for reporting facsimile parameters from the DIS frames.

The receiving side facsimile telephone 70 transmits Digital Command Signal (DCS) and Confirmation to receive (CFR) to the CDP 43 (a26,a27) after transmitting the V.21 preamble or CSI, DSI (a21).

The FSU 20 transmits "AT+FDT" message as a responding signal to the "+FCON, +FCSI,+FDIS . . . , OK" data for reporting data transmission preparation completion to the CDP 43 (a25). The CDP 43 transmits "+FDCS . . . , CONNECT,<XON>" data to the FSU 20 for reporting that the facsimile connection is finally completed and facsimile data transmission will be started. The +FDCS is a data for reporting facsimile parameters from the DCS frames.

The central process unit 22 of the FSU 20 having been received "+FDCS . . . , CONNECT,<XON>" data from the CDP 43 transmits facsimile data to the receiving side facsimile telephone 70 with controlling a data buffer 23. At this time, the FSU 20 temporarily stores the facsimile data input to the modem controlling part 21 in the data buffer 23 when transmitting the facsimile data providing against unexpected error in the wireless period.

The FSU 20 provides a modem of the CDP 43 of the WLL Processing Block 40 with the facsimile data received from the transmitting facsimile telephone 10 and the CDP 43 transmits facsimile data to the receiving side facsimile telephone 70 with Pulse Coded Modulation (PCM).

The FSU 20 transmits "AT+FET=2" data to the CDP 43 (a30) and reports the transmission completion of facsimile data (a30). The CDP 43 transmits an End of Page (EOP) to the receiving facsimile telephone 70 for reporting the transmission completion of the facsimile data (a31). The receiving side facsimile telephone 70 transmits Message Confirmation (MCF) which is a receipt completion message of facsimile data to the CDP 43 (a32).

The CDP 43 confirms that the receiving side facsimile telephone 70 completes the receipt of the facsimile data and finally transmits "+FPTS :1, +FHNG=0" data to the FSU 20 (a33). The +FPTS :1 is a data for reporting status of page (or Facsimile data) received after transmitting completely Facsimile data and +FHNG=0 is a data for reporting release to a data channel after completing the transmission of facsimile data.

The CDP 43 transmits Disconnect (DCN) message to the receiving side facsimile telephone 70 for releasing a data channel set in the transmitting side facsimile telephone 10 and the receiving side facsimile telephone 70.

Transmitting Operation of a Facsimile Telephone Connected with a PSTN

Next, transmitting operation of a specific facsimile telephone connected with a PSTN will be described referring to FIG. 6.

A specific subscriber of the CDMA type WLL network hooks off a transmitting side facsimile telephone 70 connected with a PSTN 50 (b1) and confirms dial tone provided from the PSTN 50 (b2). The subscriber pushes the telephone number of the receiving side facsimile telephone 10 (b3). At this time, the telephone number of the receiving side facsimile telephone is detected as DTMF tone by the PSTN 50 and the PSTN 50 recognizes the telephone number of the receiving side.

If the transmitting side facsimile telephone 70 transmits a ring tone to the CCP 42 of the WLL Processing Block 40, the CCP 43 request call by transmitting a call paging message to the FSU 20 (b5). According to the call request, the FSU 20 transmits the ring tone to the receiving side facsimile telephone 10 (b6). The receiving side facsimile telephone 10 responds automatically or manually to the ring tone by hooking off (b7). The FSU 20 transmits paging response message as a responding signal to the call-paging message to the CCP 42 (b8). The paging response is a response signal to the voice call request of the CCP 42.

A service option procedure is proceeded between the FSU 20 and the PSTN 50, so that a channel for voice signal transmission is set (b9) and the CNG of the transmitting side facsimile telephone 70 is continuously transmitted to the receiving side facsimile telephone 10 through the voice channel (b10).

The receiving side facsimile telephone 10 selectively transmits Called Station Identification (CED) to the FSU 20 (b11) and periodically generates V.21 preamble data for transmitting to the FSU 20 (b12). The V.21 preamble data is necessary for reporting that the receiving side facsimile telephone 70 is operating in a facsimile mode. Besides, the receiving side facsimile telephone 10 periodically generates Called Subscriber Identification (CSI) or Digital Identification Signal (DIS) including product information or setting state of the specific receiving side facsimile telephone for transmitting to the FSU 20 (b13).

While the V.21 preamble data, and CSI, DIS are periodically transmitted from the receiving side facsimile telephone 10 to the FSU 20, if a facsimile tone(V.21 preamble or CED) is detected in the FSU 20 during voice telephone conversation (b14), the FSU 20 transmits a service option change request message (SO_Change_Request) to the CCP 42 of the WLL Processing Block 40 for requesting to change the service option of the transmitting side facsimile telephone 70 (b15), because the transmitting side facsimile telephone 70 is basically set as a voice service option when transmitting.

The CCP 42 reports the RLP processor 41 that the service option of the transmitting side facsimile telephone 70 has been changed and that there is a facsimile call request from the FSU 20 by transmitting a service option change response (SO_Change_Response) message which is a response signal to the service option change request message.

The RLP processor 41 transmits a call request message to the CDP 43 for requesting call to the changed facsimile service option (b17), and the CDP 43 assigns modem resources and transmits a call response message to the RLP processor 41 as a signal responding to the request (b18), so that a Radio Link protocol (RLP) used in a radio period of the BTS 30 and the FSU 20 is set (b19). At this time, the voice channel set between the RLP processor 41 and the trunk processing part 44 is closed and a new data channel of the RLP processor 4113 the CDP 4313 the trunk processing part 44 is set.

A G3 data controller having been received a modem action request (b20) and formed in the CDP 43 of the WLL Processing Block 40 initializes the assigned modem and sets Point-to Point Protocol (PPP) and Transmission Control Protocol/Internet Protocol (TCP/IP) between the FSU 20 and the WLL Processing Block 40 (b21).

The initial setting of a modem for transmitting facsimile data between the FSU 20 and the transmitting facsimile telephone 70 agrees with the initial setting of a modem for transmitting facsimile data between the WLL Processing Block 40 and the receiving facsimile telephone 70 through a modem configuration procedure.

While the CDP 43 is set as a receiving modem (ATA) (b23), if the V.21 preamble or CSI, DIS are periodically transmitted from the receiving facsimile telephone 70 to the CDP 43 (b24), and Nos-standard Facilities (NSF), Called Subscriber Identification CSI, Digital Identification Signal (DIS) are periodically transmitted to the receiving side facsimile telephone 70 (b25), the receiving side facsimile telephone 70 transmits the TSI and Digital Command Signal (DCS) to the receiving side facsimile telephone 70.

The CDP 43 transmits "+FCON, +FTSI,+FDCS . . . ,OK" data to the FSU 20 (b27). The +FCON is a data for reporting that facsimile connection established, +FTSI is a data for reporting calling party No. with CSI frame, and the +FDCS is a data for reporting facsimile parameters from the DCS frames.

The FSU 20 transmits AT+FDR data to the CDP 43 for reporting that the preparation for receiving facsimile data is completed (b29). The CDP 43 transmits having been received the report transmits "+FCFR, +FDCS . . . , CONNECT" data to the FSU 20 for reporting that facsimile connection is finally completed and the facsimile data transmission will be started (b31). The FCFR is a data for sending CFR(confirmation to received) confirmation and +FDCS is a data for reporting facsimile parameters from the DCS frames, and CONNECT is a data for reporting that the connection between the users 10, 70 is finally established and the facsimile data started to be transmitted.

The FSU 20 having been received "+FCON, +FTSI,+FDCS . . . ,OK" data transmits Digital Command Signal (DCS) and Confirmation to Receive (CFR) to the receiving side facsimile telephone 10 (b28, b30).

The transmitting side facsimile telephone 70 transmits the CFR to the CDP 43 (b32) and transmits the facsimile data to the receiving side facsimile telephone 10 (b33). The facsimile data are provided to a modem of the FSU 20 and the modem of the FSU 20 modulates the data with Pulse Coded Modulation (PCM) for transmitting to the receiving side facsimile telephone 10. At this time, the data provided to the modem of the FSU 20 is temporarily stored in a buffer according to a control signal of the FSU 20 and thereafter transmitted to the receiving side facsimile telephone 10. The control signal is controlled to agree a modem setting between the FSU 20 and the receiving facsimile telephone 10 with a modem between the transmitting side facsimile telephone 70 and the CDP 43.

The transmitting side facsimile telephone 70 transmits an End of Page (EOP) to the CDP 43 for reporting the transmission completion of the facsimile data. The CDP 43 transmits "+FPTS:1, +FET:2" data and so on to the FSU 20 for reporting the transmission completion of the facsimile data (b35). The FSU 20 transmits the EOP to the receiving side facsimile telephone 10.

The receiving side facsimile telephone 70 transmits Message Confirmation (MCF) to the CDP 43 for reporting release of data channel (b37). The CDP 43 transmits the "+FHNG:0, OK" data and so on to the FSU 20 for reporting the release of the data channel and the FSU 20 transmits DCN for reporting the final release of connection between the users 10, 70 (b39).

That is, according to the present invention, two ways of supporting become possible with relation to the transmitting operation of the facsimile telephone connected with the PSTN.

In a first receiving way, if the receiving side facsimile telephone 10 is connected with a facsimile port of the FSU 20, the receiving facsimile telephone 10 sets a service option as a facsimile call for transmitting the CDP 42 of the WLL Processing Block 40 to response to a call paging of the transmitting side facsimile telephone 70. Accordingly, the facsimile data can be received through a data channel of the RLP 4113 the CDP 4313 the trunk processing part 44.

In a second receiving way, the FSU 20 uses both a voice mode and a facsimile mode by the manual operation of the user by using one port. In this case, the current received call can not be distinguished whether a voice call or a facsimile call. Accordingly, a voice call should be set in case that the user hooks off a receiver of the facsimile telephone and a facsimile mode should be set in case that the facsimile telephone automatically responses. In order to supporting such functions, the facsimile call should be set by detecting the facsimile tone data (V.21 preamble, CED and so on) provided from the receiving side facsimile telephone 10. This is possible when the same function as detecting V.21 preamble of a vocoder (not shown) including the RLP 41 should be located in the FSU.

At this time, information related to the DIS provided with the V.21 preamble is controlled not to be transmitted to the transmitting side facsimile telephone 10 in the place where the V.21 preamble detecting device of the WLL Processing Block 40 or the FSU 20 is located, because the transmitting side facsimile telephone 70 may erroneously operate if the information related to the DIS is transmitted to the transmitting side facsimile telephone 10.

In the present invention, the following solution is provided to prepare the case that the process efficiency of the wireless period used for preparing a wire period.

First, in case that a specific facsimile telephone transmits a facsimile call, the FSU 20 confirms that the central process unit 22 processes the transmitting call and controls the process efficiency of the modem formed in the modem controlling part 21 by using AT command making appropriate to the wireless period.

In case that a specific facsimile telephone receives the facsimile call, the process efficiency of the modem of the modem controlling part 21 is set to be equal to the process efficiency of the WLL Processing Block 40. Such setting is an important element for processing the facsimile transmitting and receiving signals in real time.

As above, it is possible to provide a facsimile service using a facsimile telephone with performing a digital facsimile service and a service option within the WLL network without adding an extra network element, since a voice call is firstly set as a basic call when there is a transmitting operation or a receiving operation to a facsimile telephone and a voice conversation and facsimile service with the receiving side are provided in state of connecting the PSTN or the FSU with the facsimile telephone.

Moreover, it is possible to provide a conversion service from a voice service to a facsimile call without disconnecting call by adding facsimile tone (V.21 preamble, CED) detection function within the PSTN and the WLL system.

What is claimed is:

1. In a Wireless Local Loop (WLL) network including at least one or more Fixed Subscriber Units (FSUs) and Base Transceiver Stations (BTSs), a WLL Processing Block, and a Public Switched Telephone Network (PSTN), a method for servicing facsimile using WLL system comprising:

requesting call establishment of a second facsimile telephone connected with the PSTN in a first facsimile telephone connected with the FSU;

responding to the request of the call establishment automatically or manually in the second facsimile telephone;

converting a service mode of the first facsimile telephone to a data mode in case that a facsimile tone provided from the second facsimile telephone to the first facsimile telephone is detected after the response and transmitting data from the first facsimile telephone to the second facsimile telephone;

requesting the FSU to change the service mode of the first facsimile telephone in the WLL Processing Block in case that the facsimile tone generated in the second facsimile telephone is detected in the WLL Processing Block after the response;

changing the service mode to a data mode by the FSU according to the request and reporting to the WLL Processing Block; and assigning resources by the WLL Processing Block according to the report and setting data call between the FSU and the WLL Processing Block based on the resources.

2. The method of claim 1, wherein the service mode of the first facsimile telephone is set as a voice mode when the call establishment is requested in the first facsimile telephone.

3. The method of claim 1 further comprising:

transmitting data from the first facsimile telephone to the second facsimile telephone through the set data call.

4. The method of claim 3, wherein reporting further comprises:

reporting the change of the service mode to a Call Control Processor of the WLL Processing Block by the FSU;

reporting the change of the service mode to a Radio Link Protocol (RLP) processor by the Call Control Processor; and requesting call to the changed service mode to a Circuit Data Processor (CDP) of the WLL Processing Block.

5. The method of claim 4, wherein call setting further comprises:

assigning resources by the CDP according to the request of the RLP processor and setting radio link protocol used in wireless interface; and setting data call based on the assigned resource and the set radio link protocol.

6. The method of claim 3, wherein transmitting data comprises:

temporarily storing data transmitted from the first facsimile telephone in a buffer of the FSU; and transmitting the stored data to the second facsimile telephone according to a control signal of the FSU.

7. The method of claim 6, wherein the control signal controls to agree a modem setting between the first facsimile telephone and the FSU with a modem setting between the second facsimile telephone and a Circuit Data Processor (CDP).

8. The method of claim 3, wherein information related to Digital Identification Signal (DIS) included in the detected facsimile tone are controlled not to be transmitted to the first facsimile telephone.

9. The method of claim 1, wherein the FSU controls a modem installed in the FSU to correspond to the RLP by using AT command when the first facsimile telephone requests call establishment.

10. The method of claim 1, wherein the modem setting between the first facsimile telephone and the FSU agrees with the modem setting between the second facsimile telephone and a Circuit Data Processor (CDP).

11. In a Wireless Local Loop (WLL) networks including at least one or more Fixed Subscriber Units (FSUs) and Base Transceiver Stations (BTSs), a WLL Processing Block, and a Public Switched Telephone Network (PSTN), a method for servicing facsimile using WLL system comprising:

requesting call establishment of a second facsimile telephone connected with the FSU in a first facsimile telephone connected with the PSTN;

responding to the request of call establishment automatically or manually in the second facsimile telephone; and converting a service mode of the first facsimile telephone to a data mode in case that a facsimile tone provided from the second facsimile telephone to the first facsimile telephone is detected after the response and transmitting data of the first facsimile telephone to the second facsimile telephone, wherein the transmitting further comprises,     requesting WLL Processing Block to change of the service mode of the first facsimile telephone in the FSU in case that the facsimile tone generated in the second facsimile telephone is detected in the FSU after the response,     changing the service mode to a data mode by the WLL Processing Block according to the request and reporting to the FSU, and     assigning resources by the WLL Processing Block according to the report and setting data call between the FSU and the WLL Processing Block based on the resources.

12. The method of claim 11, wherein the facsimile tone is detected in the FSU.

13. The method of claim 11, wherein transmitting further comprises:

transmitting data from the first facsimile telephone to the second facsimile telephone through the set data call.

14. The method of claim 13, wherein transmitting data comprises:

temporarily storing data transmitted from the first facsimile telephone in a buffer of the FSU; and     transmitting the stored data to the second facsimile telephone according to a control signal of the FSU.

15. The method of claim 14, wherein the control signal controls to agree a modem setting between the second facsimile telephone and the FSU with a modem setting between the first facsimile telephone and a Circuit Data Processor (CDP).

16. The method of claim 13, wherein reporting further comprises;

reporting the change of the service mode of the first facsimile telephone to the FSU and reporting the change of the service mode to Radio Link Protocol (RLP) by a Call Control processor of the WLL Processing Block; and     requesting call to the changed service mode to a circuit data processor (CDP) of the WLL Processing Block.

17. The method of claim 16, call setting step further comprising:

assigning resources by the FSU according to the request of the RLP processor and setting radio link protocol used in wireless interface; and     setting data call based on the assigned resource and the set radio link protocol.

18. The method of claim 11, wherein the FSU controls a modem installed in the FSU to correspond to the RLP by using AT command when the first facsimile telephone requests call establishment.

19. The method of claim 13, wherein information related to Digital Identification Signal (DIS) included in the detected facsimile tone are controlled not to be transmitted to the first facsimile telephone.

20. In a Wireless Local Loop (WLL) network including at least one or more Fixed Subscriber Units (FSUs) and Base Transceiver Stations (BTSs), a WLL Processing Block, and a Public Switched Telephone Network (PSTN), an apparatus for servicing facsimile using WLL system comprising:

means for requesting call establishment of a second facsimile telephone connected with the PSTN in a first facsimile telephone connected with the FSU;

means for responding to the request of the call establishment automatically or manually in the second facsimile telephone;

means for converting a service mode of the first facsimile telephone to a data mode in case that a facsimile tone provided from the second facsimile telephone to the first facsimile telephone is detected after the response and transmitting data from the first facsimile telephone to the second facsimile telephone;

means for requesting the FSU to change the service mode of the first facsimile telephone in the WLL Processing Block in case that the facsimile tone generated in the second facsimile telephone is detected in the WLL Processing Block after the response;

means for changing the service mode to a data mode by the FSU according to the request and reporting to the WLL Processing Block;

means for assigning resources by the WLL Processing Block according to the report and setting data call between the FSU and the WLL Processing Block based on the resources; and     means for transmitting data from the first facsimile telephone to the second facsimile telephone through the set data call.

* * * * *